United States Patent
Khawand

(10) Patent No.: US 6,889,049 B2
(45) Date of Patent: May 3, 2005

(54) METHOD AND SYSTEM FOR EFFICIENTLY USING A MOBILE UNIT FOR SWITCHING BETWEEN COMMUNICATIONS SYSTEMS

(75) Inventor: Jean Khawand, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/261,523

(22) Filed: Sep. 30, 2002

(65) Prior Publication Data

US 2004/0203805 A1 Oct. 14, 2004

(51) Int. Cl.[7] ............................................. H04Q 7/20
(52) U.S. Cl. ........................ 455/452.1; 455/432.3; 455/435.1; 455/434
(58) Field of Search ......................... 455/552.1, 553.1, 455/525, 432.1, 432.3, 434, 435.1, 435.2, 435.3, 436, 437, 438, 439, 440, 448

(56) References Cited

U.S. PATENT DOCUMENTS 5,666,650 A  *  9/1997  Turcotte et al. ......... 455/437 X
5,903,832 A  *  5/1999  Seppanen et al. ........ 455/435.3
6,285,874 B1 *  9/2001  Magnusson et al. ..... 455/436 X

* cited by examiner

*Primary Examiner*—Nick Corsaro
*Assistant Examiner*—Philip J. Sobutka
(74) *Attorney, Agent, or Firm*—Scott M. Garrett

(57) ABSTRACT

The invention provides a method and apparatus for allowing a multi-mode mobile communication unit (102) to switch efficiently between communication systems. The method includes creating and adaptively updating a footprint database (210) relating the coverage of the multiple communication systems. The footprint database (210) comprises a plurality of system lists (220). The system lists (220) each include a plurality of cell entries (222) linking cells of a particular system to cells in other systems. Each of the plurality of cell entries is identified by a cell frequency (342) and a color code (344). The method further comprises the step of installing and dynamically updating the footprint database (210) on the mobile unit (102). Accordingly, an apparatus of the invention includes a mobile unit (102) having the aforementioned database installed thereon. The mobile unit (102) additionally includes processing tools (212) for accessing a user selected system list upon receiving a user request and for locating the selected system by cycling through cell entries in the system lists.

25 Claims, 5 Drawing Sheets

METHOD AND SYSTEM FOR EFFICIENTLY USING A MOBILE UNIT FOR SWITCHING BETWEEN COMMUNICATIONS SYSTEMS

TECHNICAL FIELD

This invention is generally related to mobile units supporting multiple communication systems, and more particularly, to the ability of the mobile units to efficiently and quickly switch between the multiple communication systems without assistance from other network equipment.

BACKGROUND OF THE INVENTION

Multi-mode subscriber units are designed to operate with multiple communication systems. Multi-mode subscriber units are further capable of operating in a large geographic area that is not limited to one communication system but is rather covered by multiple communication systems. A multi-mode subscriber unit operating within this larger geographic area may move from an area of coverage of one communication system to an area of coverage of another communication system. The multi-mode subscriber unit is required to switch between systems and perform the transition between communication systems in a timely manner incurring the smallest amount of transition time. In order for the multi-mode subscriber unit to be able to transition to a target communication system, the multi-mode subscriber unit must find a target cell location associated with the target communication system.

Finding the target cell location and connecting to the target communication system can consume time and increase current drain. A subscriber is likely to become frustrated with attempting to switch communication systems over an exceedingly long time period. The multi-mode subscriber unit may also be required to operate on two communication systems either simultaneously or in a time division multiplexed manner. On a current system, the subscriber may be able to initiate and receive interconnect telephone calls, while on another (target) system, the subscriber is required to initiate and receive dispatch calls. The subscriber therefore must locate candidate target cells on the target communication system. The subscriber must therefore switch its RF reception to these candidate target cells to monitor the target system and then revert back to its current system.

Therefore, the multi-mode subscriber unit generally keeps a list of candidate target cells in the supported communication systems. Candidate target cells are cells that have sufficient RF coverage to be utilized in the subscriber's area. Currently, the subscriber unit cycles through all cells in order to locate the target cell. Searching through all candidate target cells is an exceedingly time-consuming process. Accordingly, a more time efficient and streamlined technique for switching systems is needed.

SUMMARY OF THE INVENTION

Accordingly, in order to overcome the aforementioned and other deficiencies in the art, an aspect of the invention provides a method for relating coverage of multiple mobile communication systems within a mobile unit that supports multiple communication systems. The method comprises creating a footprint database relating the coverage of the multiple communication systems. The footprint database includes a plurality of systems lists which include a plurality of cell entries linking cells of a particular system to at least one cell in at least one other system. Each cell is identified by a cell frequency and a color code. The method additionally comprises the step of installing the footprint database on the mobile unit.

In yet another aspect, the invention comprises a method for operating a mobile unit that supports multiple communication systems. The method comprises utilizing a footprint database to aid the mobile unit in switching from a source communication system to a target communication system. The footprint database includes a plurality of system lists having a plurality of cell entries linking cells of a particular system to at least one cell in another system. Each cell is identified by a cell frequency and a color code and includes a list of neighbors. The method additionally includes the step of identifying a current cell by a current cell frequency and a current cell color code. The method additionally comprises the step of identifying possible target cells through attempting an initial acquisition on target cells located on a current cell list of neighbors.

In yet another aspect, the invention comprises a multi-mode mobile communication unit capable of efficiently switching between multiple communication systems. The multi-mode mobile communication unit comprises a footprint database having a plurality of system lists. Each system list contains a plurality of cell entries linking cells of a source system to at least one cell of at least one target system. Each cell entry is identified by at least a color code and a frequency. The multi-mode mobile communication unit further includes processing tools for accessing a user selected system list upon receiving a user request and for locating the selected system by cycling through cell entries in the system list.

In yet a further aspect, the invention comprises a method for operating a mobile unit that supports multiple communication systems in order to efficiently switch between the multiple communication systems. The method comprises creating a footprint database relating the coverage of the multiple communication systems. The method additionally comprises dynamically updating the footprint database and utilizing the footprint database to aid the mobile unit in switching from a source communication system to a target communication system.

DETAILED DESCRIPTION

Figure 1:
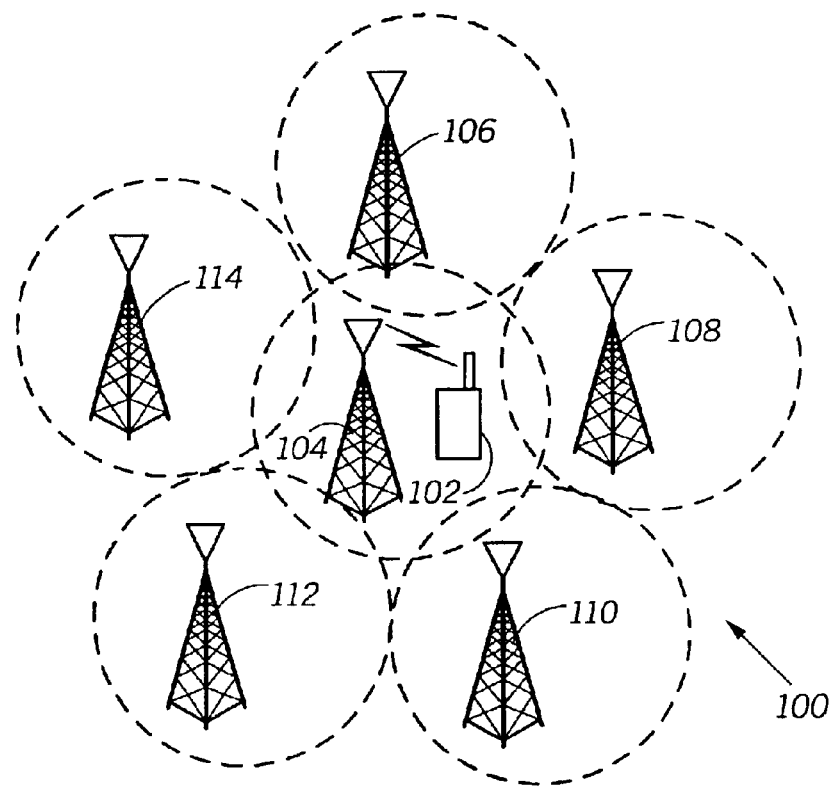
FIG. 1 shows a cellular communication system diagram.

With reference to FIG. 1, a cellular communication system 100 includes a multi-mode communication unit or communication device 102. The communication device 102 is shown receiving service from a serving cell 104. The serving cell 104 has neighbor cells 106, 108, 110, 112, and 114. Each serving cell enables the reuse of similar frequencies by multiple sources to support services in metropolitan areas that are distant from one another. Upon connecting via an air interface to the serving cell 104, the communication device 102 obtains a list of neighbor cells from the serving cell 104 and stores the list in memory. A neighbor cell can be defined as cell covering a geographical area adjacent that of the serving cell.

Figure 2:
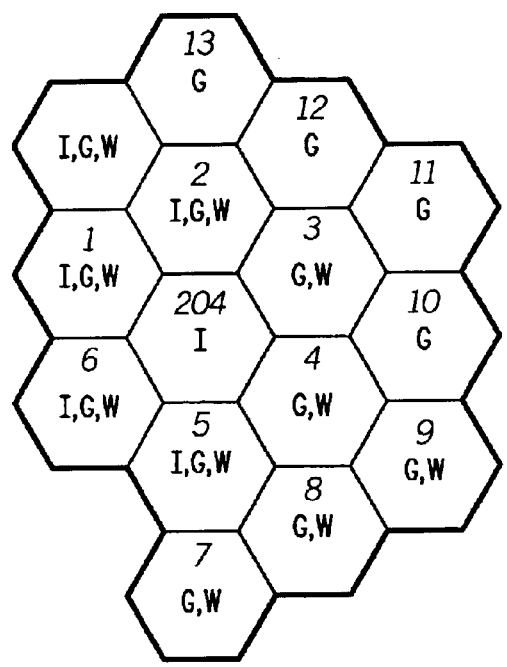
FIG. 2 is a diagram showing multi-mode characteristics of the cellular communication system.

FIG. 2 is a diagram showing the multi-mode nature of the cellular communication system 100. In the diagram, "I" represents a serving cell receiving iDEN service, "G" represents a serving cell receiving global system for mobile communication (GSM) service and "W" represents a serving cell receiving wideband carrier detection multiple access code division (WCDMA) services. Each cell provides one or more of the aforementioned services or protocols. Each cell is also identified by a color which is a number identifying a cell. In FIG. 2, the communication device 102 is camped on an iDEN cell 204 and is attempting to detect a target cell for communication with a GSM or WCDMA system. A potential target cell as used herein is a cell that has sufficient RF coverage to be utilized in the area of the subscriber.

Figure 3:
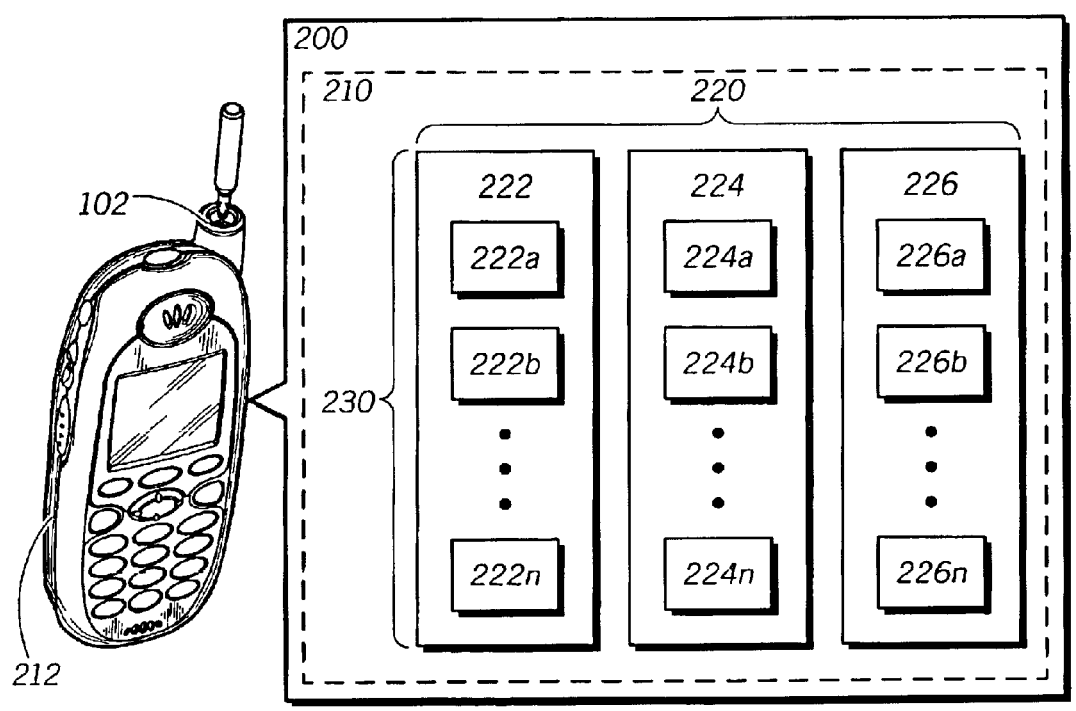
FIG. 3 shows a multi-mode communication unit and database information stored on the multi-mode communication unit.

As shown in FIG. 3, communication device 102 has a memory 200 having a footprint database 210 stored thereon. Processing tools 212 access and process the information in the footprint database 210. In order to detect a GSM or WCDMA system, the communication device 102 accesses the footprint database 210 stored in its memory 200. The footprint database 210 includes a plurality of system lists 220 linking each cell of a selected system to each cell of the other systems available in the multi-mode system. The system lists 220 are preferably arranged in an array and each system list 220 includes a plurality of cell entries 230, which also may be arranged in an array. In the embodiment shown in FIG. 3, the system lists 220 include lists 222, 224, and 226. The system list 222 includes cell entries 222a . . . n, the system list 224 includes cell entries 224a . . . n, and the system list 226 includes cell entries 226a . . . n.

Figure 4:
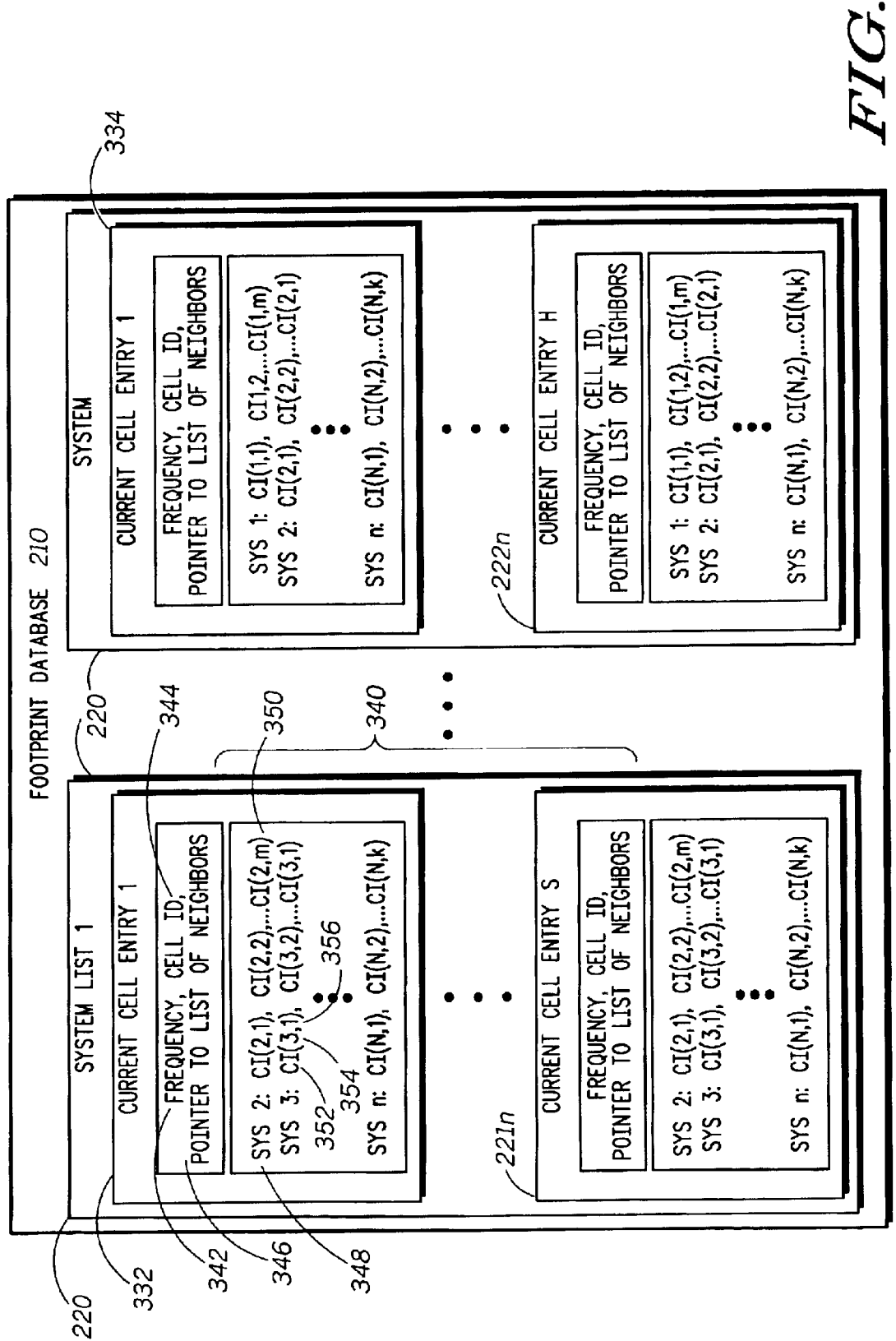
FIG. 4 shows the database information in greater detail.

FIG. 4 shows the configuration of the system lists 220 in greater detail. Each system offering service within the communication system 100 has a system list 220. Each system list includes a cell entry for each cell providing coverage within the system. In the embodiment shown in FIG. 4, a system I list 332 and a system J list 334 are shown.

Each system list 332, 334 includes a plurality of cell entries 340. Each cell entry includes a frequency 342, a cell ID or color code 344, and a pointer 346 to a list of neighbors 348. The list of neighbors 348 is organized by system as shown by entry 350. The neighbor list 348 for the system 350 shown in the current cell entry 340 includes a cell ID 352, which is followed in parentheses by a system number 354 and a cell number 356.

The footprint database 210 is dynamic in nature and is constructed over time as the communication device 102 moves to different geographic areas. The communication device 102 is aware at any time of characteristics of the base cell 104 that the communication device 102 is camped on. The communication device 102 has information about the base cell 104 including frequency and color code. Using this information, the processing tools 212 of the communication device 102 search a list of target frequencies corresponding to the base cell 104. In other words, if camped on cell entry 1 of system I, if the communication device 102 wants to switch to system 3, it looks at the system 3 list within current cell entry 1 for cells operating within the desired parameters.

If the communication device 102 is currently utilizing a system I and is camped on current cell identified by a cell entry 1, the communication device 102 seeks a cell entry based on the identity of a target system. If the target system is a system J, the communication device 102 accesses the system J information in a system list I, current cell entry 1. The communication device 102 then finds a list of frequencies belonging to the target system J.

Figure 5:
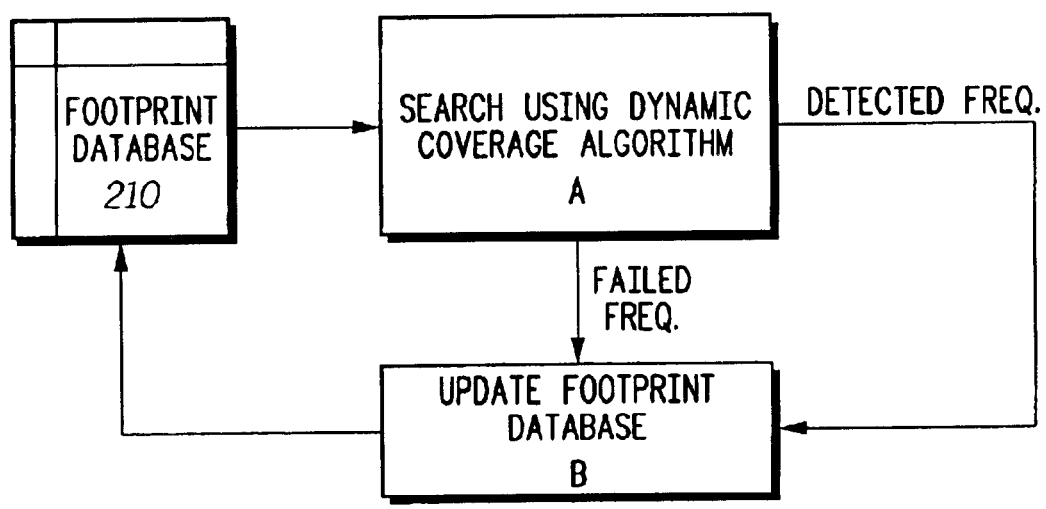
FIG. 5 is a flow chart illustrating a method for switching communication systems and updating the footprint database.

FIG. 5 shows a preferred method for switching systems using the above-described footprint database 210. In a first main procedure A, the communication device 102 consults its footprint database 210 and searches the footprint database 210 to locate and switch to a selected target system. In procedure B, the communication device 102 updates the footprint database 210 with information related to the selected target system and a new current cell. Procedure B is performed regardless of the outcome of Procedure A. In other words, the communication device 102 updates the footprint database 210 regardless of whether a target system is found.

Figure 6:
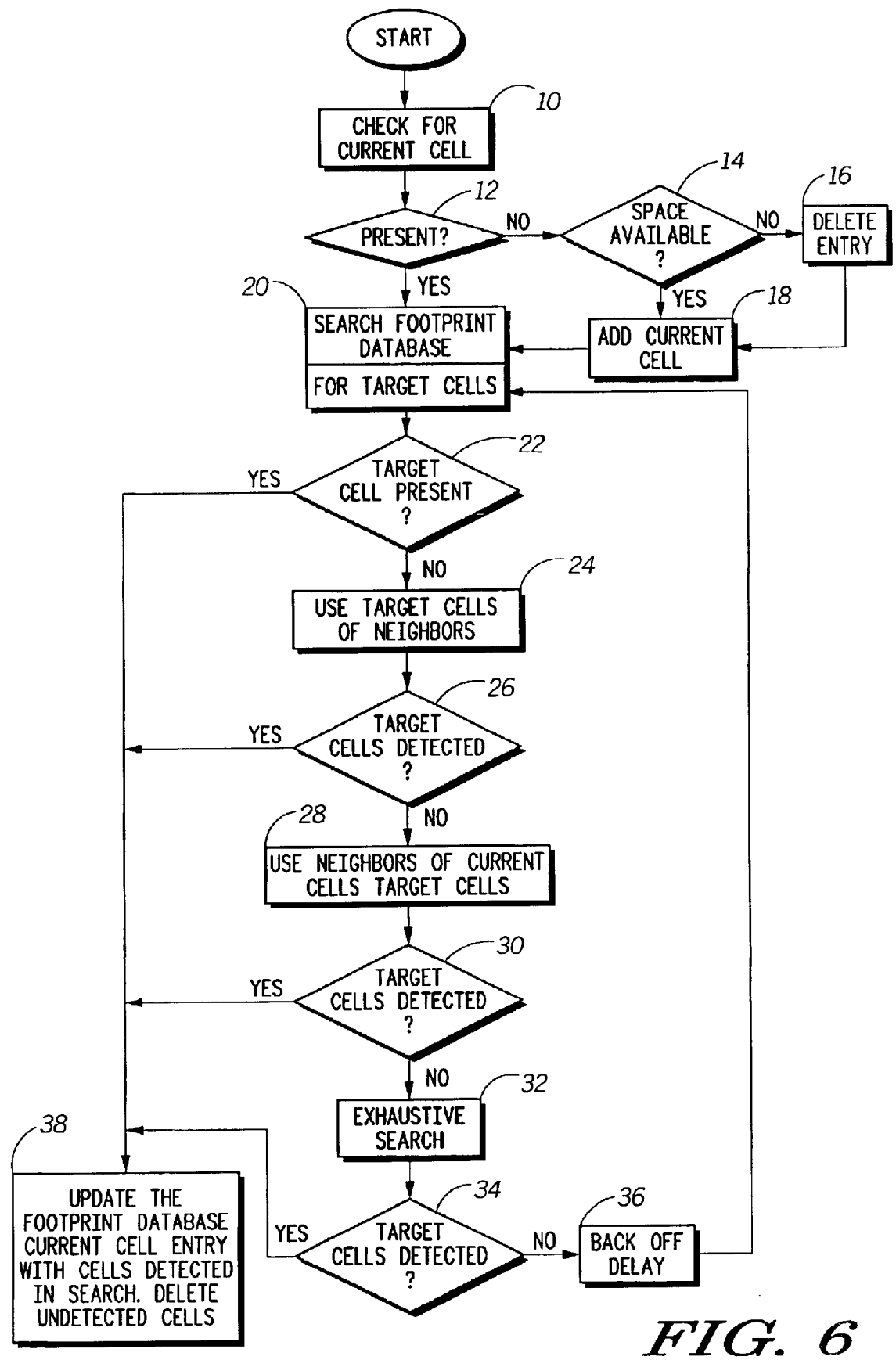
FIG. 6 is a flow chart showing the method for switching communication systems and updating the footprint database in greater detail.

FIG. 6 shows the method for using the footprint database 210 for switching communication systems in greater detail. In step 10, the communication device 102 checks for the current cell 104 (the cell on which the communication system 102 is currently camped) in the footprint database 210. In step 12, if the current cell 104 is not present in the footprint database 210, the communication device 102 checks for space in the footprint database 210 and adds the current cell 104 in step 18 if space is available. If no space is available in step 14, the communication device 102 deletes an entry present in the footprint database 210 in step 16. The communication device 102 may delete the least frequently used entry in the or the least recently used entry in the footprint database 210 depending upon the particular requirements of the multi-mode communication system 100. After deleting the aforementioned information, the communication device 102 adds the current cell in step 18.

After ensuring that current cell data is correctly represented in the footprint database 210, the communication device 102 searchers the footprint database 210 to locate and switch to a selected target system in step 20. The communication device 102 searches for the target system using the current cell target list. The communication system 102 conducts the search of step 20 by looking for a base list of frequencies and searching for target cells in the base list of frequencies. In step 22, the communication device 102 determines whether any target cells are present in the base list of frequencies. If no target cells are present in the list of frequencies in step 22, the communication device 102 uses the footprint database 210 to search for target cells by using the target cells of the current cell's neighbors in step 24. In step 24, the communication device 102 obtains lists of target frequencies using the neighbors of the base cell 104 by searching neighbor lists of frequencies. If the neighbor lists of frequencies are empty in step 26, the communication device 102 searches for target cells using the neighbors of the current cell's target cells in step 28 by searching the neighbor lists of frequencies. If in step 30, if the neighbor lists of frequencies are empty, the communication device 102 searches all possible target cell frequencies in step 32. If this exercise fails in step 34, the communication device 102 delays in step 36 before repeating the entire search procedure. Otherwise if target cells are located during any of the aforementioned steps, the communication device 102 connects with the target system and updates the footprint database 210 in step 38.

In step 38, the communication device 102 updates the base cell entry with a target neighbor list and target cells detected during the search and deletes any undetected cells. In this manner, the communication device 102 dynamically updates the footprint database 210.

While embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

I claim:

1. A method for relating coverage of multiple mobile communication systems within a mobile unit that supports multiple communication systems, the method comprising:

creating a footprint database relating the coverage of the multiple communication systems, wherein the footprint database comprises a plurality of system lists, the system lists including a plurality of cell entries linking cells of a particular system to cells in other systems, wherein each of the plurality of cell entries is identified by a cell frequency and a color code; and installing the footprint database on the mobile unit.

2. The method of claim 1, wherein the step of creating the footprint database further comprises the step of providing a list of neighboring cells.

3. The method of claim 1, further comprising the step of dynamically updating the footprint database.

4. A method for operating a mobile unit that supports multiple communication systems in order to efficiently switch between the multiple communication systems, the method comprising:

utilizing a footprint database to aid the mobile unit in switching from a source communication system to a target communication system, the footprint database comprising a plurality of system lists, the system lists including a plurality of cell entries linking each cell of a particular system to at least one cell in another system, wherein each of the cell entries is identified by a cell frequency and a color code, and includes a list of neighbors;

identifying a current cell by a current cell frequency and a current cell color code; and identifying possible target cells through attempting an initial acquisition on target cells on a current cell list of neighbors.

5. The method of claim 4, further comprising the step of processing an identified target cell to acquire a target communication system.

6. The method of claim 4, further comprising attempting a second acquisition if the initial acquisition is unsuccessful, by identifying target cells from a second set of cells linked to neighbors of the current cell.

7. The method of claim 6, further comprising processing an identified target cell in the second set of cells to acquire a target communication system.

8. The method of claim 6, further comprising attempting at least one additional acquisition if the second acquisition is unsuccessful, by identifying a target cell from a third set of cells listed as neighbors of the target cells linked to the current cell.

9. The method of claim 8, further comprising processing an identified target cell in the third set of cells to acquire a target communication system.

10. The method of claim 8, comprising searching all other cells on the system list for a target cell if the at least one additional acquisition is unsuccessful.

11. A multi-mode mobile communication unit capable of efficiently switching between multiple communication systems, the multi-mode mobile communication unit comprising:

a footprint database, wherein the footprint database comprises a plurality of system lists, each system list containing a plurality of cell entries linking cells of a source system to cells of at least one target system, each cell entry being identified by at least a color code and a frequency; and processing tools for accessing a user selected system list upon receiving a user request and for locating the selected system by cycling through cell entries in the system list.

12. A method for operating a mobile unit that supports multiple communication systems to efficiently switch between the multiple communication systems, the method comprising:

creating a footprint database relating the coverage of the multiple communication systems, performed by creating a plurality of system lists, the system lists including a plurality of cell entries linking cells of a particular system to cells in other systems, wherein each of said cell entries is identified by a cell frequency and a color code;

dynamically updating the footprint database; and utilizing the footprint database to aid the mobile unit in switching from a source communication system to a target communication system.

13. The method of claim 12, wherein each of said cell entries additionally comprises a list of neighboring cells.

14. The method of claim 12, wherein updating the footprint database comprises updating a current cell entry to include a target cell that has been acquired and creating a new entry for the current cell in the footprint database if no entry for the current cell exists.

15. The method of claim 12, further comprising the step of programming the footprint database into the mobile unit.

16. The method of claim 12, wherein updating comprises reading system information of one target cell after acquiring the one target cell and updating the current cell entry to include neighbors of the target cell.

17. The method of claim 16, further comprising updating the current cell entry according to a search of target cells through linking a newly acquired target cell to a list of target cells linked to the current cell.

18. The method of claim 17, further comprising deleting a cell based on one of least frequent use and least recent use if the list of target cells has a size limit.

19. The method of claim 12, wherein the step of utilizing the footprint database comprises:

identifying a current cell by a current cell frequency, a current cell color code, and a current cell list of neighbors; and identifying possible target cells from a first set of cells through attempting an initial acquisition on target cells linked to the current cell entry.

20. The method of claim 19, further comprising processing an identified target cell from the first set of cells to acquire a target communication system.

21. The method of claim 19, further comprising attempting a second acquisition if the initial acquisition is unsuccessful, by identifying at least one target cell from a second set of cells linked to neighbors of the current cell.

22. The method of claim 21, further comprising processing each identified target cell from the second set of cells to acquire a target communication system.

23. The method of claim 21, further comprising attempting at least one additional acquisition if the second acquisition is unsuccessful, by identifying at least one target cell from a third set of cells listed as neighbors of the target cells linked to the current cell.

24. The method of claim 23, further comprising processing an identified target cell from the third set of cells to acquire a target communication system.

25. The method of claim 23, comprising searching all other cells on the system list if the at least one additional acquisition is unsuccessful.

* * * * *